March 21, 1939.　　M. M. MORACK　　2,151,560
ELECTRIC VALVE CONVERTING SYSTEM
Filed April 1, 1937
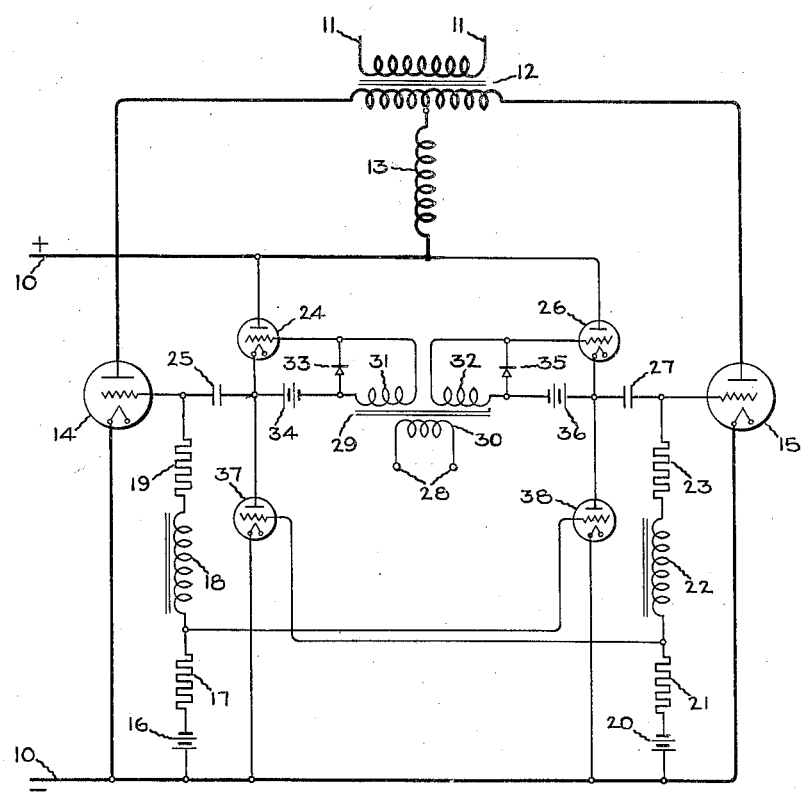
Inventor:
Marvin M. Morack,
by Harry E. Dunham
His Attorney.

Patented Mar. 21, 1939

2,151,560

UNITED STATES PATENT OFFICE 2,151,560

ELECTRIC VALVE CONVERTING SYSTEM

Marvin M. Morack, Schenectady, N. Y., assignor to General Electric Company, a corporation of New York Application April 1, 1937, Serial No. 134,332

12 Claims. (Cl. 175—363)

My invention relates to electric valve converting systems and more particularly to that type of system suitable for transferring energy from a direct current circuit to an alternating current circuit.

In transferring energy from direct current circuits to alternating current circuits by means of electric valve converting systems utilizing valves containing an ionizable medium, it has been customary to provide some means for commutating the current between the electric valves. In order to commutate the current between such valves, it has been necessary to produce a voltage difference between the voltage appearing across the valve which has been conducting the current and the voltage appearing across the valve which has just been rendered conductive and to which the load current is to be transferred. Such voltage differences generally are sufficient to effectively reduce the voltage across the valve which has been conductive to substantially zero or at least to such a value which will permit the grid of the valve to regain control of the valve and to cause the current through this valve to be interrupted. In some instances these conditions have been brought about by supplying to the system an alternating potential obtained from an auxiliary source, whereas in other instances, as for example in the case of the parallel type of inverter, this has been brought about by connecting a commutating capacitor between the anodes of the valves. In certain cases it may be desirable to provide a simplified form of parallel inverter in which provision is made for obtaining a transfer of current from one valve to another without the use of a source of commutating potential, without appreciably varying the voltages appearing across successively conductive valves, or without producing substantial variation between the relative values of the voltages appearing across the respective valves.

In accordance with my invention, I utilize electric discharge devices or valves of the grid control type in which the apertures of the grids are of such magnitude that upon the application of a suitable negative potential thereto a substantially continuous positive ion sheath will be formed about these grids which will operate to interrupt the flow of current between the anode and the cathode. This negative potential is applied to the grid by the control circuit which is responsive to the initiation of the discharge in the next succeeding valve. The current is interrupted, or commutation is effected, by the grid circuit in contradistinction to effecting commutation by relative values of the anode voltage of the respective values.

It is an object of my invention to provide an improved electric valve converting system which will overcome some of the above mentioned disadvantages of electric power converting apparatus utilizing electric valves, and which will be simple and reliable in operation.

It is a further object of my invention to provide an electric valve converting apparatus for transferring energy from a direct current source to an alternating current circuit in which the necessity of a commutating voltage means has been obviated.

For a better understanding of my invention, together with other and further objects thereof, reference may be had to the single figure of the accompanying drawing and its scope will be pointed out in the appended claims.

In carrying out my invention I utilize a modification of the parallel type of inverter for transferring energy from the direct current circuit 10 to the alternating current circuit 11. The primary winding of the transformer 12 is connected at an intermediate terminal through a direct current reactor or inductive winding 13 to the positive side of the direct current circuit 10. The remaining terminals of the primary winding of the transformer 12 are connected through a pair of electric discharge valves 14 and 15 to the negative side of the direct current circuit 10. While the electric valves 14 and 15 may be any of the types well known in the art, I prefer to utilize electric valves containing an ionizable medium which are provided with a control grid by means of which the current through the device may be interrupted whenever the grid is at the proper negative potential with respect to its cathode. The electric valve 14 is provided with a grid-to-cathode circuit which includes a suitable source of biasing potential 16 for the purpose of maintaining the electric valves normally nonconductive. This circuit also includes a resistor 17, an inductive winding or inductor 18, and a grid circuit current limiting resistor 19. Similarly, the grid-to-cathode circuit of the electric valve 15 includes the biasing source 20, a resistor 21, an inductor 22 and a resistor 23. While I have shown these biasing sources 16 and 20 to be in the form of batteries, it, of course, will be understood by those skilled in the art that an alternating potential 180 degrees out of phase with respect to the applied anode voltage or an oxide rectifier may be utilized in place of these batteries. An auxiliary discharge device 24 is connected between the upper terminal of the direct current circuit 10 and the grid of the valve 14 through a capacitor or energy storage device 25. A similar valve 26 is connected between the same side of the direct current circuit and the grid of the valve 15 through a capacitor 27. Each of the valves 24 and 26 is provided with a control circuit arranged to be energized from a suitable source of alternating current 28. The source of alternating current 28 is connected to a transformer 29 of the saturable type provided with a primary winding 30 and secondary windings 31 and 32. The negative half cycles of alternating current appearing across secondary winding 31 are by-passed by a suitable unidirectional conducting device 33 which may be in the form of a copper oxide rectifier. The grid circuit of the valve 24, which includes the winding 31 and the rectifier 33, is also provided with a suitable source of biasing potential 34. The grid circuit for the electric valve 26 includes the inductive winding 32, a rectifying device 35 and a suitable source of biasing potential 36. An auxiliary valve 37 is connected between the lower side of the direct current circuit 10 and the common junction between the electric valve 24 and the capacitor 25. The grid circuit of the valve 37 includes the resistor 21 and the biasing source 20 which elements are a part of the grid-to-cathode circuit of valve 15. An auxiliary valve 38 is connected between the lower conductor of the direct current circuit 10 and the junction point between the electric valve 26 and the capacitor 27. The grid circuit of the auxiliary valve 38 includes the resistor 17 and the biasing potential 16 which elements are part of the grid-to-cathode circuit of valve 14. While I have shown the valves 24 and 26 to be valves each comprising a cathode, an anode, and a control electrode or grid, it is to be understood that these valves may be any of the types well known in the art including those of the pure electron discharge type, although I find it preferable to utilize valves containing an ionizable medium in which the discharge therethrough is controlled by a starting electrode or control grid.

In considering the operation of my invention, it will be assumed that both of the valves 14 and 15 are in a nonconductive condition and that the source of alternating potential 28 has such a phase relation as to cause a positive impulse to be introduced into the control circuit of the valve 24. It will be apparent to those skilled in the art that the unidirectional conducting device 33 of the control circuit of electric valve 24 is in such direction as to by-pass the negative voltages introduced into the winding 31, thereby preventing any transient voltage from affecting the control grid of the valve 24. Thus it will be assumed that the valve 24 is now conductive and that current flows from the upper terminal of the direct current circuit 10 through the valve 24, the capacitor 25, the resistor 19, inductor 18, resistor 17, and biasing source 16, to the other side of the direct current circuit 10. The flow of this current through the resistors 19 and 17 will now cause a potential to appear across these resistors which is of sufficient magnitude to render ineffective the effect normally obtained by the biasing source 16. Thus the control electrode of the electric valve 14 is of such potential to permit an electric discharge to flow therethrough. This discharge will continue through the electric valve 14 and meanwhile the capacitor 25 will be charging to a certain voltage. Due to the fact that the inductor 18 is connected in series with the capacitor 25, the capacitor 25 will assume a resultant voltage somewhat greater than the impressed direct current voltage. The capacitor 25 is chosen to be of such size that it will charge to the proper value during the time interval between the impulses supplied by the alternating current source 28. Due to the fact that the capacitor 25 has assumed a resultant voltage greater than the impressed direct current voltage, the current through the valve 24 will now cease and biasing source 34 will prevent this valve from becoming conductive. It will now be assumed that the alternating voltage appearing across the winding 32 of the transformer 29 is such as to render conductive the electric valve 26. As soon as the valve 26 becomes conductive current flows from one side of the direct current circuit through the valve 26, the capacitor 27, resistor 23, inductor 22, resistor 21, biasing source 20, to the other side of the direct current circuit 10. The voltage appearing across the resistors 21 and 23 is of such magnitude as to render ineffective the effect of the biasing voltage 20, thereby causing the electric valve 15 to become conductive. It will be remembered that the resistor 21 is also in the grid-to-cathode circuit of the electric valve 37. The voltage across the resistor 21 is also of sufficient magnitude to render ineffective the effect of the biasing voltage 20 in the grid-to-cathode circuit of the valve 37. Thus it will be apparent that the valve 37 is now rendered conductive and current is supplied to this valve by the charge existing across the capacitor 25. Since the capacitor 25 cannot discharge instantaneously through the circuit including the battery 16, resistors 17 and 19 and inductor 18 due to the high transient impedance presented by the inductor 18, the positive terminal of the capacitor 25 is in effect tied to the cathode of the electric valve 14. Thus the grid of the valve 14 is at a high negative potential with respect to its cathode and meanwhile the voltage drop appearing across the resistors 17 and 19 is added to the bias presented by the battery 16. Thus the capacitor 25 causes the grid of the electric valve 14 to be at a high negative potential with respect to its cathode so that a substantially continuous positive ion sheath is caused to appear about the grid. This positive ion sheath appearing about the grid of the valve interrupts the load current flowing therethrough with the result that the load current now flows through the valve 15 which previously had been rendered conductive. The negative voltages appearing across the resistors 17 and 19, which supplement the negative bias of the battery 16, operate to maintain the grid of the electric valve 14 at this high negative potential for some time after the capacitor 25 has begun to discharge through the valve 37. It will be apparent to those skilled in the art that the control circuit associated with the electric valve 15 operates in the same manner as the control circuit associated with electric valve 14 so that further explanation of this control circuit is not believed necessary for a clear understanding of the principles of my invention.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangements and in the instrumentalities employed without departing from the spirit and scope of my invention as set forth in the appended claims.

What I claim as new and desire to secure by Letters Patent in the United States is:

1. The combination comprising an electric valve containing an anode, a cathode and a control grid, a control circuit therefor comprising a grid-to-cathode circuit including an impedance and biasing means for normally maintaining said valve nonconductive, means including a capacitor for transmitting current to said impedance so as to develop a voltage sufficient to render ineffective said biasing means, and means for discharging said capacitor through said impedance thereby to develop a voltage of such sign and magnitude as to cause said grid to render said valve nonconductive.

2. The combination comprising an electric valve containing an ionizable medium and a control grid, a control circuit therefor comprising a grid-to-cathode circuit including an impedance and biasing means for normally maintaining said valve non-conductive, means including a capacitor for transmitting current to said impedance so as to develop a voltage sufficient to render ineffective said biasing means, and means for discharging said capacitor through said impedance thereby to develop a voltage of such sign and magnitude as to cause a substantially continuous positive ion sheath to be formed about said control grid.

3. The combination comprising an electric valve containing an ionizable medium and a control grid energized from a source of direct current, a control circuit therefor including a grid-to-cathode circuit comprising an impedance device and biasing means for normally maintaining said valve nonconductive, means including a capacitor energized from said direct current source for transmitting current to said impedance device to render ineffective said biasing means, and means for discharging said capacitor through said impedance means so as to impress a high negative voltage upon the grid of said valve thereby forming a substantially continuous positive ion sheath thereabout to interrupt the flow of current through said valve.

4. The combination comprising a plurality of electric valves each containing an ionizable medium and a control grid, a control circuit for each of said valves comprising a grid-to-cathode circuit including an impedance device and biasing means for normally maintaining said valve nonconductive, a circuit comprising a capacitor connected in series with the elements of said grid-to-cathode circuit and arranged to be energized from said direct current source, means for controlling the flow of current to said last-mentioned circuit for rendering ineffective said biasing means, a discharge circuit for said capacitor including said impedance device and a controlled auxiliary electric valve, and means for controlling said auxiliary electric valve in response to flow of energy in the grid-to-cathode circuit of the next valve to be rendered conductive.

5. In combination, a direct current supply circuit, an alternating current load circuit, electric valve converting apparatus interconnecting said circuits and comprising a pair of electric valves each comprising an anode, a cathode and a control electrode within an ionizable medium, the control electrode of each of said valves being of such construction as to provide a substantially continuous positive ion sheath sufficient to interrupt the flow of current in said valve without additional commutating means upon the application of a negative potential thereto above a predetermined value, and control circuits connected to each of said control electrodes for alternately initiating current flow in said valves and for applying to each of said control electrodes a negative potential above said predetermined value in response to the initiation of current flow in the other of said valves.

6. An electric valve converting system for transferring energy from a direct current circuit to an alternating current circuit comprising an inductive winding provided with an intermediate terminal thereon, means connecting said intermediate terminal to one side of said direct current circuit, a pair of electric valves interconnecting the remaining terminals of said inductive winding with the other side of said direct current circuit, each of said valves containing an ionizable medium and a control grid, a control circuit for each of said grids comprising a grid-to-cathode circuit including an impedance device and biasing means for normally maintaining said valve nonconductive, a circuit arranged to be energized from said direct current circuit including a capacitor connected in series with the elements of said grid-to-cathode circuit, means for transmitting current to said last-mentioned circuit to render ineffective said biasing means thereby causing said valve to become conductive, a circuit for discharging said capacitor including said impedance device and an auxiliary controlled electric valve, each of said auxiliary electric valves being controlled in response to the initial flow of energy through the grid-to-cathode circuit of the other of said electric valves.

7. In combination, a direct current source, an output circuit including an inductive winding provided with an intermediate terminal for connection to one side of said direct current source, a pair of controlled electric valves interconnecting the outer terminals of said inductive winding with the other side of said direct current source, said valves each being provided with a control grid having relatively small apertures, means for normally biasing said grids to prevent said valves from becoming conductive, means for rendering ineffective said bias to cause said valves to become conductive alternately, and energy storage means for alternately supplying additional bias to assist said normal bias thereby alternately rendering said valve nonconductive.

8. An electric valve converting system for transferring energy from a direct current source to an alternating current circuit comprising an inductive winding connected at an intermediate point thereon to said direct current source, a pair of electric valves interconnecting the remaining terminals of said inductive winding with the other side of said direct current source, each of said valves containing an ionizable medium and being provided with a control grid, means for normally biasing said grids to prevent said valves from becoming conductive, means for rendering said bias ineffective to alternately render said valves conductive, means responsive to the conductivity of one of said valves for supplying sufficient additional bias to the other of said valves to assist said normal bias thereby to cause a substantially continuous positive ion sheath about said grids to be formed to render said valves nonconductive.

9. An electric valve converting system for transferring energy from a direct current circuit to an alternating current circuit comprising an inductive winding connected at an intermediate point thereon to said direct current circuit, a pair of electric valves interconnecting the other side of said direct current circuit with said inductive winding, each of said valves containing an ionizable medium and being provided with a control electrode, means for impressing on said control electrode a biasing voltage for normally maintaining said valves nonconductive, means for periodically rendering ineffective said biasing voltage, means responsive to the conductivity of the other of said valves for placing a bias upon the control electrode of the first valves of such sign and magnitude as to interrupt the flow of current therethrough.

10. In combination, a direct current source, an output circuit including an inductive winding provided with an intermediate terminal arranged to be connected to one side of said direct current source, a pair of controlled electric valves interconnecting the outer terminals of said inductive winding with the other side of said direct current source, each of said valves containing an ionizable medium and being provided with a control grid having relatively small apertures, means for normally biasing said grids to prevent said valves from becoming conductive, means for rendering ineffective the bias of one of said valves to cause said valve to become conductive, means for subsequently rendering ineffective the other bias to cause the other of said valves to become conductive, and means responsive to said latter mentioned means for subsequently supplying additional bias to the grid of said first valve to assist said normal bias thereby to render said valve nonconductive.

11. An electric valve converting system for transferring energy from a direct current circuit to an alternating current circuit comprising an inductive winding provided with an intermediate terminal thereon, means connecting said intermediate terminal to one side of said direct current circuit, electric valve means interconnecting the remaining terminals of said inductive winding with the other side of said direct current source, said electric valve means each containing an ionizable medium and being provided with a control grid of such configuration as to permit a substantially continuous positive ion sheath to be formed thereabout, biasing means for normally maintaining said valves nonconductive, means for rendering ineffective said bias, said means each comprising an auxiliary electric valve and an energy storage device connected between one side of said direct current circuit and the control grid of one of said first mentioned valves, and means for discharging said energy storage device through the circuit including said biasing means thereby to cause a substantially continuous positive ion sheath to be formed about the control grid of said first mentioned electric valve.

12. An electric valve converting system for transferring energy between direct and alternating current circuits comprising an inductive winding connected at an intermediate point thereon to one side of said direct current circuit, a plurality of electric valves interconnecting the remaining terminals of said inductive winding with the other side of said direct current circuit, each of said electric valves containing an ionizable medium and being provided with a control grid, a control circuit for each of said electric valves comprising a source of periodic potential, an auxiliary electric valve arranged to be responsive to said potential, said auxiliary electric valve being connected in series with a capacitor across said direct current circuit, a circuit connected between said capacitor and the grid of said valve including a resistor, an inductive winding and a biasing means for normally maintaining said valve nonconductive, a second electric valve connected between one side of said direct current circuit and the other side of said capacitor, said second electric valve being provided with a control circuit responsive to the flow of energy through the grid circuit of the other of said first mentioned valves.

MARVIN M. MORACK.